United States Patent [19]

Huber

[11] Patent Number: 5,097,408

[45] Date of Patent: Mar. 17, 1992

[54] APPARATUS FOR SPECIFYING A RESULT RELATION IN A RELATIONAL DATABASE SYSTEM BY SELECTION OF ROWS

[75] Inventor: Val J. Huber, Chelmsford, Mass.

[73] Assignee: Wang Laboratories, Inc., Lowell, Mass.

[21] Appl. No.: 450,505

[22] Filed: Dec. 14, 1989

Related U.S. Application Data

[63] Continuation of Ser. No. 690,845, Jan. 11, 1985, abandoned.

[51] Int. Cl.⁵ .............................................. G06F 15/40
[52] U.S. Cl. ................................... 395/600; 364/282.1; 364/283.4; 364/283.2; 364/237.2; 364/236.8; 364/DIG. 1
[58] Field of Search ... 364/200 MS File, 900 MS File

[56] References Cited

U.S. PATENT DOCUMENTS

| | | | |
|---|---|---|---|
| 3,533,082 | 10/1970 | Schnabel et al. | 364/200 |
| 4,068,298 | 1/1978 | Dechant et al. | 364/200 |
| 4,128,891 | 12/1978 | Lin et al. | 364/900 |
| 4,141,078 | 2/1979 | Bridges, Jr. et al. | 364/900 |
| 4,186,438 | 1/1980 | Benson et al. | 364/900 |
| 4,205,371 | 5/1980 | Feather et al. | 364/200 |
| 4,221,003 | 9/1980 | Chang et al. | 364/900 |
| 4,283,771 | 8/1981 | Chang | 364/900 |
| 4,317,171 | 2/1982 | Maejima et al. | 364/200 |
| 4,382,277 | 5/1983 | Glaser et al. | 364/200 |
| 4,384,325 | 5/1983 | Slechta, Jr. et al. | 364/200 |
| 4,422,158 | 12/1983 | Galie | 364/900 |
| 4,468,728 | 4/1984 | Wong | 364/200 |
| 4,476,528 | 10/1984 | Matsumoto et al. | 364/200 |
| 4,479,196 | 11/1984 | Ferrer et al. | 364/900 |
| 4,497,039 | 1/1985 | Kitakami et al. | 364/900 |
| 4,498,145 | 2/1985 | Baker et al. | 364/900 |
| 4,506,326 | 3/1985 | Shaw et al. | 364/900 |
| 4,514,826 | 4/1985 | Iwata et al. | 364/900 |
| 4,543,630 | 9/1985 | Neches | 364/200 |
| 4,570,217 | 2/1986 | Allen et al. | 364/900 |
| 4,611,298 | 9/1986 | Schuldt | 364/900 |
| 4,613,946 | 9/1986 | Forman | 364/300 |
| 4,631,664 | 12/1986 | Bachman | 364/200 |
| 4,631,673 | 12/1986 | Haas et al. | 364/300 |
| 4,642,762 | 2/1987 | Fisanick | 364/300 |
| 4,644,471 | 2/1987 | Kojima et al. | 364/300 |
| 4,648,044 | 3/1987 | Hardy et al. | 364/300 |

OTHER PUBLICATIONS

N. Wencerbo-con: Integrated Data Dictionary for a Database, IBM Technical Disclosure Bulletin: vol. 20, #8, Jan. 1978, pp. 3324-3327.

K. Urano et al.: "Intellilgent Environment for End-User Oriented Application Generation", Proceedings Compcon, 84 Fall; The Small (R) Evolution, Sep. 16, 1984, pp. 457-462.

(List continued on next page.)

Primary Examiner—Kevin A. Kriess
Attorney, Agent, or Firm—Michael H. Shanahan; Kenneth L. Milik

[57] ABSTRACT

In a data processing system having a relational database, novel relational operator means is provided that accepts a cursor defined against a database target. The system retrieves record occurrences from the target as defined by the cursor; the means accepts predefined display format signals and defines a stored screen image responsive to the format signals and the retrieved record occurrences. The screen image is displayed to a user on the system display, and is modified in response to enumerating signals input by the user through the system keyboard during such display. The operator means derives from the modified screen image and the cursor, output signals defining a result relation, membership in which is defined enumeratively and interactively through the keyboard. Alternatively, using other format signals for the display, characterizing signals are input by the user, and a result relation, membership in which is defined in terms of attributes in the target, is defined interactively. In either case, the operator means further defines in the screen image a plurality of selectable operations, executable with respect to the result relation, and responds to further user signals input during display, to provide an output signal representative of a selected operation.

1 Claim, 10 Drawing Sheets

OTHER PUBLICATIONS

M. W. Blasgden et al.: "System R: An Architectral Overview", IBM Sys., vol. #1, 1981, pp. 457-462.

D. M. Choy et al.; Mechanism for Generating Unclustered Link Structure in Relational Data Base System, IBM Technical Disclosure Bulletin, vol. 20, Dec. 1977, pp. 2829-2831.

D. R. Ries et al: An Architecture for a Data Base Centered Office System DA, Journal of Telecommunication Networks, vol. 2, No. 4, 1983, pp. 445-462.

C. W. Kaufman et al: "The DACOS Forms Based Query System", Journal of Telecommunication Networks, vol. 2, No. 4, 1983, pp. 463-482.

R. M. Curtices et al.: "Data Dictionaries: An Assessment of Current Practice Problems", Proceedings 7th International Conference on Very Large Data Base, Sep. 9-11, 1981, pp. 564-570.

D. J. Pullin et al: "Method for Accessing Hierarchial Views of a Binary Relational Database", IBM Technical Disclosure Bulletin, vol. 26, No. 5, Oct. 1983, pp. 2557-2559.

R. L. Benneworth et al.: "The Implementation of GERM, An Entity Relationship Base Management System", Proceedings 7th International Conference on Very L Data Bases, Sep. 9-11, 1981, pp. 478-484.

L. A. Rowe et al.: "A Form Application Development System", Proceedings of the International Conference on Management of Data, Jun. 2-4, 1982, pp. 28-38.

D. D. Chamberlain et al.: "Support for Repetitive Transactions and Ad Hoc Query in System R", A. C. M. Transactions on Database Systems, vol. 6, No. 1, Mar., pp. 70-94.

Macintosh Manual, 1984, p. 59.

U. Kamper et al., "Das Relational Datenbanksystem MEMODAX", Angewandte Informatick, vol. 26, No. 4, Apr. 1984, pp. 152-163.

Proceedings of the International Conference on Management of Data, Orlando, Jun. 2-4, 1982, pp. 28-38, Ass. for Computing Mach., U.S.

L. A. Row et al., "A Form Application System", *sections 2, 3*.

A. C. M. Transactions on Data Base Systems, vol. 6, No. 1, Mar. 1981, pp. 70-94; Ass. for Computing Mach., New York, U.S.

IBM Technical Disclosure Bulletin, vol. 20, No. 8, Jan. 1978, pp. 3324-3327, New York, U.S.

N. Winterbottem: Integrated Data Dictionary for a Database.

Journal of Telecommunication Networks, vol. 2, No. 4, 1982, pp. 445-462, Rockville, Md., U.S.

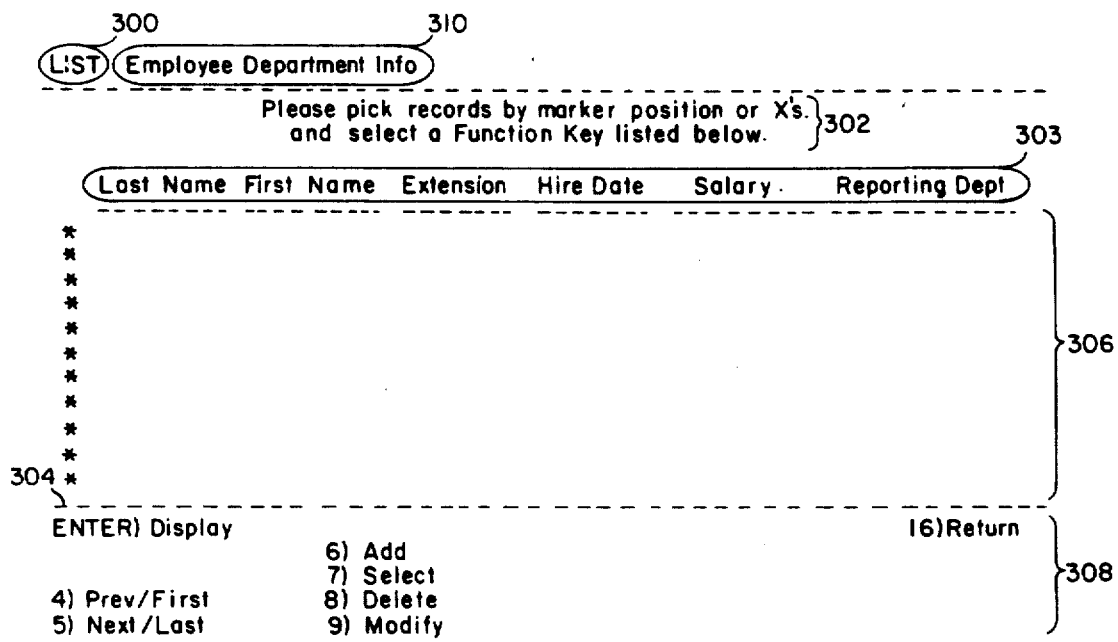

*Fig. 8a*

LIST Employee Department Info
------------------------------------------------
          Please pick records by marker position or X's,
              and select a Function Key listed below.

Last Name  First Name  Extension  Hire Date  Salary     Reporting Dept
        ---------  ----------  ---------  ---------  ---------  --------------
     *  HORNE      GLENN       4400       02/22/77   25,250.00  MIDWEST
     *  HUBER      JANET       6000       12/07/76   45,750.00  NORTHEAST
     *  JACOBER    LEVI        7500       04/13/84   37,000.00  INTERNATIONAL
     *  KANE       JOHN        7600       06/25/84   22,150.00  PACIFIC
     *  KAPLAN     DENNY       2000       12/18/77   27,000.00  EUROPEAN
     *  KEATING    WARREN      5700       05/15/84   21,250.00  EUROPEAN
     *  LYONS      PAT         1700       12/28/82   33,333.00  NORTHEAST
     *  MATHEW     DOUGLAS     4300       06/15/76   74,000.00  INTERNATIONAL
     *  MCKEEVER   VAL         2100       06/06/84   18,350.00  EUROPEAN
     *  MCKINNEY   KATHY       5500       10/01/81   29,500.00  INTERNATIONAL
     *  MORRISSEY  JIM         6600       08/29/82   17,500.00  INTERNATIONAL
------------------------------------------------
ENTER) Display                                                      16) Return
            6) Add
            7) Select
4) Prev / First    8) Delete
5) Next / Last     9) Modify

*Fig. 8b*

| SCREEN LOCATION | SCREEN LENGTH | MEMORY LOCATION | LENGTH OF VARIABLE | TYPE |
|---|---|---|---|---|
| | | | | |
| | | | | |
| | | | | |
| | | | | |

155      174

```
DISPLAY Employee Department Info
------------------------------------------------
              Please press a Function Key listed below.

Last Name:              HORNE
First Name:             GLENN
Extension:              4400
Hire Date:              02/22/77
Salary:                 25,250.00
Reporting Dept:         MIDWEST
Reporting Dept Location: CHICAGO
Reporting Dept Budget:  400,000.00
On Loan Dept:           SALES
On Loan Dept Location:  LOWELL
On Loan Dept Budget:    500,000.00

------------------------------------------------
                                                      16) Return
                    6) Add 8) Delete
  5) Next/Last      9) Modify
```

DISPLAY SCREEN 402

```
                        310
SELECT Employee Department Info
------------------------------------------------
   LOW-Specify Equal, Generic or Low Range values.
        Enter selection criteria and press a Function Key listed below.
                    Press (↑7) for options.
Last Name:              ?*********
First Name:             ?*********
Extension:              ?***
Hire Date:              ?*******
Salary:                 ?*********
Reporting Dept:         ?*************
Reporting Dept Location: ?
Reporting Dept Budget:  ?
On Loan Dept:           ?***************
On Loan Dept Location:  ?
On Loan Dept Budget:    ?

------------------------------------------------
 ENTER) List      1) Clear                            16) Return
                  6) Add
  3) Down         7) High-Low / Options
                  8) Delete
                  9) Modify
```

SELECT SCREEN 404

*Fig. 13*

```
┌─────────────────────────────────────────────────────────────────────┐
│ ADD  Employee  Department  Info                                     │
│ ─────────────────────────────────────────────────────────────────── │
│ Please fill in the requested information and press (ENTER) to Add the record.
│         or press another Function Key listed below.                  │
│                                                                      │
│ Last Name:              **********                                   │
│ First Name:             *********                                    │
│ Extension:              ****                                         │
│ Hire Date:              ********                                     │
│ Salary:                 0.00********                                 │
│ Reporting Dept:         ****************                             │
│ Reporting Dept Location:                                             │
│ Reporting Dept Budget:  0.00                                         │
│ On Loan Dept:           ****************                             │
│ On Loan Dept Location:                                               │
│ On Loan Dept Budget:    0.00                                         │
│                                                                      │
│ ─────────────────────────────────────────────────────────────────── │
│ ENTER) Add         7) Set Defaults                       16) Return │
└─────────────────────────────────────────────────────────────────────┘
                     406-2                         406-1
```

```
┌─────────────────────────────────────────────────────────────────────┐
│ MODIFY Employee Department Info                                     │
│ ─────────────────────────────────────────────────────────────────── │
│ Please modify the displayed information and press (ENTER) to Modify the record.
│         or press a Function Key listed below.                        │
│                                                                      │
│ Last Name:              HORNE*****                                   │
│ First Name:             GLENN*****                                   │
│ Extension:              4400                                         │
│ Hire Date:              02/22/77                                     │
│ Salary:                 25,250.00**                                  │
│ Reporting Dept:         MIDWEST********                              │
│ Reporting Dept Location: CHICAGO                                     │
│ Reporting Dept Budget:  400,000.00                                   │
│ On Loan Dept:           SALES**********                              │
│ On Loan Dept Location:  LOWELL                                       │
│ On Loan Dept Budget:    500,000.00                                   │
│                                                                      │
│ ─────────────────────────────────────────────────────────────────── │
│ ENTER) Modify      1) Skip record                        16) Return │
└─────────────────────────────────────────────────────────────────────┘
                              406-3
```

```
┌─────────────────────────────────────────────────────────────────────┐
│ DELETE Employee Department Info                                     │
│ ─────────────────────────────────────────────────────────────────── │
│             Please press (ENTER) to delete this record.              │
│                 or press a Function Key listed below.                │
│                                                                      │
│ Last Name:              HORNE                                        │
│ First Name:             GLENN                                        │
│ Extension:              4400                                         │
│ Hire Date:              02/22/77                                     │
│ Salary:                 25,250.00                                    │
│ Reporting Dept:         MIDWEST                                      │
│ Reporting Dept Location: CHICAGO                                     │
│ Reporting Dept Budget:  400,000.00                                   │
│ On Loan Dept:           SALES                                        │
│ On Loan Dept Location:  LOWELL                                       │
│ On Loan Dept Budget:    500,000.00                                   │
│                                                                      │
│ ─────────────────────────────────────────────────────────────────── │
│ ENTER) Delete      1) Skip record                        16) Return │
└─────────────────────────────────────────────────────────────────────┘
```

*Fig. 14*

APPARATUS FOR SPECIFYING A RESULT RELATION IN A RELATIONAL DATABASE SYSTEM BY SELECTION OF ROWS

This is a continuation of copending application Ser. No. 06/690,845 filed on 1/11/85, now abandoned.

This application is filed with a microfiche appendix, comprising 9 microfiche and 439 frame.

My invention relates to the operation of data processing systems, in particular to the management of relational databases stored in the memory of such systems. The invention further relates to means to facilitate the interactive use and updating of the such databases.

BACKGROUND OF THE INVENTION

The invention is employed in a data processing system, having one or more terminals or consoles which provide display means and keyboard signal input means, and providing in storage physical records modeled as at least one relational database.

Among the individual ultimate users of the data processing system and database records are some users, such as clerks, who are not programmers. Such users which to be able to use the system terminals to view displayed representations of the records stored in the data processing system memory, to select specific records or parts of records to view, to delete or modify physical records ion the memory, or to add new physical record to the memory. For this purposes the physical records must be selected, accessed in the physical storage, and retrieved (copied), and representations of the retrieved records must be displayed to the user at one of the terminals in some predetermined display format.

To permit this use of the stored database records, there must be provided in the data processing system stored coded instructions which when executed by the data processing system cause representations of the physical records, as well as representations of signals input by the user through the keyboard, to be displayed in a particular format on the display. Further, there must be provided stored coded instructions which when executed by the data processing system cause the interpretation of the signals input by the user through the keyboard, and which cause the retrieval and modification of the physical records of the stored database in response to such input signals.

Such instructions, designed for a particular use of the records of a particular database, together comprise one of a class of programs known as "database applications programs", that is, programs used by the ultimate user of the data processing system to carry out the application desired by him on the stored physical records of a particular database.

The preparation of such applications programs has typically required weeks or months of effort by an applications programmer, followed by additional weeks to detect and eliminate errors in the program so that it becomes reliable and relatively error-free in use.

It is therefore desirable to provide means for simplifying the construction and operation of such database applications programs, and it is an object of my invention to provide such means.

As is well understood in the art, the user (or programmer) of a data processing system does not deal directly with the physical records stored in the system's memory. Rather, he deals with a model of such records, provided when needed by means of programming stored in the system's memory and executed by the processor as needed. Referring to FIG. 2, the physical records are stored on physical media, advantageously as magnetic signals stored on magnetic disks 24 comprising secondary memory 16. The magnetic signals are physically organized on disks 24 in a manner well understood in the art of managing such memory media. The particular organization of such signals, and the particular means of locating them and copying them into main memory 14, are highly dependent on the hardware aspects of the particular memory media employed.

Several models of the records are provided, having different degrees of abstraction from the underlying stored physical records. Briefly, these are (referring to FIG. 2): the "external" view (26 or 28), in which "external" or "logical" records are seen by a particular user; the "conceptual view" (30), in which "conceptual" records are seen, each external view being a subset of the conceptual view; and the "internal" view (32) in which "internal" or "stored" records are seen.

It will be recognized that, when the data processing system operates to construct and present for use the records of each view shown in FIG. 2, these records are at that time (during such use) represented within the data processing system by physical signals derived from the magnetic signals stored on disks 24. When such use is concluded, the constructed records are no longer physically represented within system 10. In contrast, the underlying physical records stored on disks 24 remain on the disks at all times, whether or not they are in use, until deleted or modified.

The signals representing the records as seen in the various views 26, 28, 30, and 32 are derived from the physical records stored on media 24 by the data processing system, by means of the operation of a database management system, in other words by the execution of a suitable stored program by processor 12. As seen in the conceptual showing of FIG. 3, the physical records on media 24 are physically written, copied, and deleted by the data processing system under the control of a program element known as an access method, in a manner well understood in the art, and forming no part of the present invention. The access method is regarded as presenting to the database management system "stored" or "internal" records corresponding to and derived from the physical records.

The "internal" view is not seen by the user of the database (although it may be known to a programmer using the system). Processor 12, operating according to other portions of the database management system program, constructs from the stored or internal records the records of the conceptual view and its subsets, the external views. The definitions of the conceptual records are independent of the storage structure or the strategy employed by the access method for efficiently locating and retrieving the physical records.

Records in a database may be related to other records in the database, and the relationship is of interest to the user of the database. The relationship is itself represented as an entity in the database.

It is well understood in the database management art that the conceptual records of a database, and the relationships among them, may be organized or modeled in one of three possible ways, known as relational, hierarchical, and network models. The present invention relates to the management of the records of a database modeled as a relational database.

The records of a relational database are conceptually organized as tables (also referred to as "relations". Referring to FIG. 4, a table (relation) of a relational database comprises a plurality of rows; each row is a record (or tuple) comprising a plurality of fields. All rows of a particular table have the same number of fields. The fields of the records are arranged in columns; a column is also referred to as an attribute. The elements of a column are all members of a class of such elements, referred to as a domain, and the column is named by a column heading (domain name). Each record includes one or more fields whose content is a index or key, to be used in uniquely identifying the record.

A crucial feature of relational data structure is that associations between rows (tuples) are represented solely by data values in columns drawn from a common domain, rather than in terms of the physical location on disk of the related records.

Relational databases have various advantages over the two alternative models. Generally speaking, while hierarchical and network databases are organized to make it efficient to deal with one record at a time and to obtain a single related record at a time, relational databases are organized to make it efficient to deal with a set of records at a time and to obtain a set of related records at a time.

It is an important aspect of the relational model that the tables (relations), if they conform with certain constraints, may be considered as mathematical elements, also called relations, as to which a rigorous mathematical treatment already exists. Hence, operations on the tables can be analyzed in terms of this mathematical theory, an advantage in clearly understanding the effects of such operations. In particular, representing the data in the form of uniformly defined sets makes possible a corresponding uniformity in the set of operators which transform the sets, which simplifies the task of providing program elements for controlling a data processing system to transform such sets. It is an object of my invention to extend this advantages to aspects of database maintenance where it has not previously been provided, by providing an enumerated relation.

BRIEF SUMMARY OF THE INVENTION

A data processing system has: a keyboard providing input signals; a visual display; storage means providing signals representing a plurality of record occurrences organized as relations within a relational database; working storage; and a processor having means for controlling the visual display, for reading and writing the working storage, and for responding to the input signals. The processor further has access means for retrieving record occurrence signals from the database and for storing retrieved record occurrence signals in the working storage.

According to my invention, the data processing system is characterized by having means in the working storage for providing format signals representative of a predefined display format, and cursor signals representative of a cursor defined against a target comprising at least one of the relations in the database, and by having relational operator means for providing signals representative of a result relation, membership in which is defined enumeratively and interactively through the keyboard.

The operator means comprises cursor acceptance means for accepting the cursor signals from the working storage. The system access means is responsive to the cursor acceptance means to retrieve from the target record occurrence signals specified by the cursor.

The relational operator means further comprises screen image defining means for accepting the format signals from the working storage, and for defining and storing screen image signals representative of a screen image, responsive to the format signals and to the retrieved record occurrence signals. The processor is responsive to the operator means to control the display to display a representation of the stored screen image signals, and to modify the stored screen image signals corresponding to enumerating signals from the keyboard, input during such display, effecting enumeration of certain of the retrieved record occurrences.

The operator means further comprises means for deriving from the modified screen image signals together with the cursor signals, output signals defined a result relation, membership in which is defined enumeratively, and for storing the output signals in the working storage.

According to another aspect of my invention, the data processing system is further characterized in that the operator screen image defining means is further responsive to the predefined display format signals to define in the screen image representations of a plurality of selectable operations executable by the processor. The processor is responsive to the operator means to accept, during such display, operation selection signals input from the keyboard, effecting selection of one of the defined plurality of operations; the processor stores the operation selection signals.

The operator means further provides means responsive to the stored operation selection signals for providing and storing an output signal representative of the selected operation.

According to another aspect of my invention, the data processing system has relational operator means for providing signals representative of a result relation, membership in which is defined in terms of record occurrence attributes explicitly defined in the database, the result relation being defined interactively through the keyboard.

The operator means comprises screen image defining means for accepting the format signals from the working storage, and for defining and storing signals representative of a screen image providing generic elements and open elements. The processor is responsive to the operator means to control the display to display a representation of the screen image, and to modify the stored screen image open elements responsive to characterizing signals from the keyboard, input during such display, effecting characterization of the cursor.

The operator means further comprises means for deriving from the modified screen image together with the cursor signals, output signals defining a modified cursor which defines a result relation, membership in which is defined characteristically, and for storing the output signals in the working storage.

In preferred embodiments, the data processing system is characterized in that the format signals define two alternative mode formats, and include a mode indicator corresponding to each mode format. The relational operator means is responsive to the mode indicator for using the indicated mode format, and for either providing signals representative of a result relation, membership in which is defined enumeratively and interactively through the keyboard, or providing signals representative of a result relation, membership in which is defined in terms of record occurrence attributes explicitly defined in the database, the result relation being defined interactively through the keyboard.

In preferred embodiments, a plurality of selectable operations is defined for each mode format; for each mode format, the selectable operations include a transition operation to display according to the other mode format, and the operator means includes means responsive to the output signal representative of the transition operation to provide a mode indicator signal corresponding to the other mode to the screen image defining means, and if necessary to the cursor acceptance means, to effect the transition.

Also in preferred embodiments, the working storage provides means for providing format signals representative of a predefined update display format, and the plurality of selectable operations includes a transition to display according to the update display format signals. The data processing system provides update means responsive to an output signal, from the operator means, representing the transition operation; the update means is further responsive to the operator output signals defining a result relation, for executing the update operation on the record Occurrences. The update means provides means for accessing the update display format signals and for defining and storing screen image signals representative of a screen image having representations of an enumerated record occurrence and a selectable update operation performed on the record occurrence. The processor is responsive to the update means to display a representation of the stored screen image, and to receive and store an update operation selection signal input from the keyboard; the update means is responsive to the stored update operation selection signal to execute the update operation on the enumerated record occurrence.

Other objects, features, and advantages will appear from the following description of a preferred embodiment of my invention.

BRIEF DESCRIPTION OF THE DRAWING

FIGS. 8a and 8b show a particular screen format employed in my invention, and the same format merged with representations of record occurrences from the database to define a screen image;

FIGS. 13 and 14 show certain screen formats in greater detail; and

DETAILED DESCRIPTION OF THE INVENTION

Data processing system generally

Figure 1:
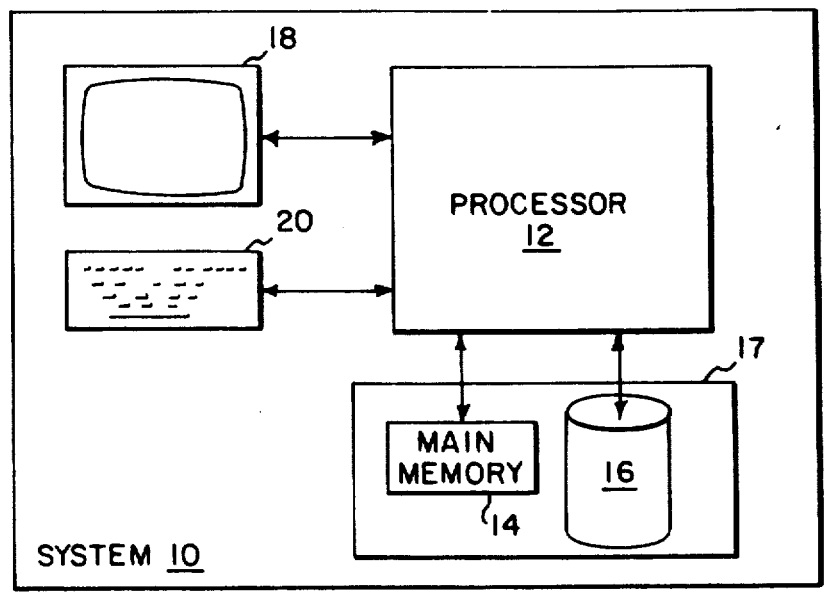
FIG. 1 is a simplified block diagram of a data processing system in which my invention is employed.

Referring now to the drawing, and in particular to FIG. 1, the data processing system 10 has a processor 12, having a main memory 14. Secondary memory 16 is provided in the form of one or more disks. Main memory 14 and secondary memory 16 together comprise storage 17. The description of the present invention does not concern itself with details of moving signals representing portions of programs or data between main memory and secondary memory, as that is well understood in the art of managing data processing systems and the present invention does not pertain to it. It is assumed that signals in all parts of storage 17 are available to processor 12.

One or more terminals or consoles, connected to processor 12, each provides a CRT screen as a display means 18 and a keyboard as signal input means 20. Other signal input means, such as mice, touch screen, voice actuation, and the like, are contemplated by my invention. If my invention is practiced in a large data processing system, there may be additional processors within the system, such as input/output processors, and the operations referred to herein as performed by the "processor" may in fact be divided among such processors. Such details do not affect the scope of the invention.

Keyboard and PF keys

Figure 5:
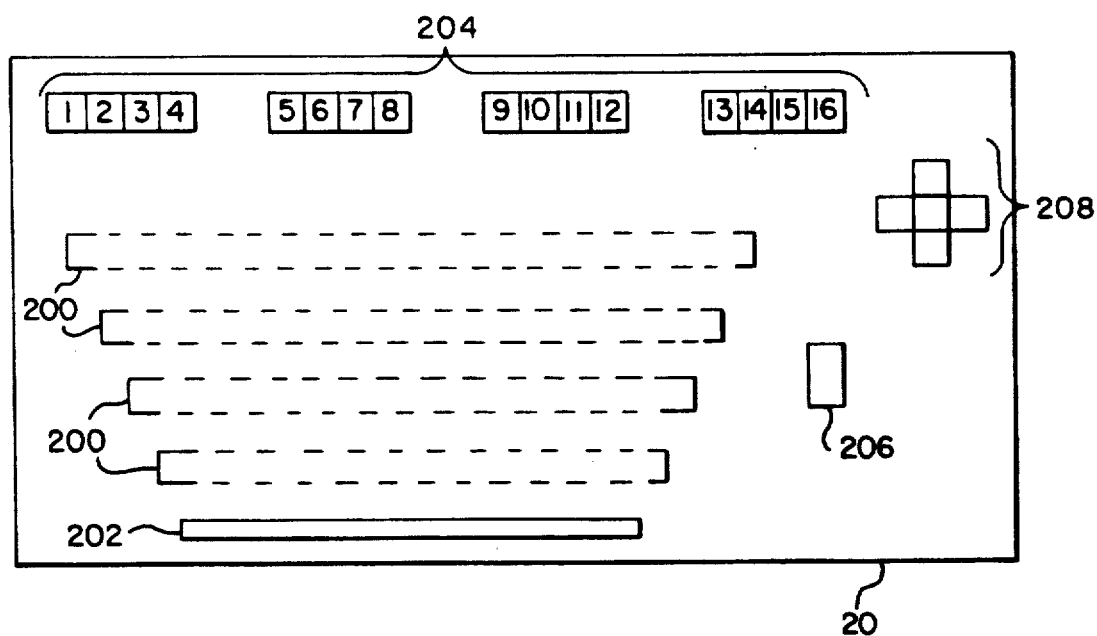
FIG. 5 shows the keyboard of the data processing system of FIG. 1.

Referring now to FIG. 5, keyboard 20 provides the usual keys of a typewriter keyboard, indicated generally at 200, with space bar 202. At the top of keyboard 20 are 16 keys 204, arranged in groups of four; these are called PF (programmed function) keys. Each is assigned a number from one to sixteen, and displays its assigned number. With the use of the shift key, these keys provide thirty-two possible programmed functions. In addition keyboard 20 provides an Enter key 206 and a pad of screen-position-marker control keys 208. (The screen-position-marker is more usually called a "cursor", but that term will not be used for this element in the present description, in order to avoid confusion with the "cursor" used in fetching multiple records from a relational database.)

Storage 17

In the description which follows, the convention is observed that words beginning with "@" are named of pointers to data structures or to elements within storage 17; that words beginning with "$" are names of parameters for particular program elements; and that words ending with "#" are named of indexes to elements within lists or sets in data structures. Elements within a data structure are named by words beginning with the data structure name ( or an abbreviation thereof), followed by a period: e.g. "qry.source" is a storage element (or in some cases the signals stored in such storage element) named "source" and located within data structure "QUERY". Words beginning with "DO" are names of modules within the calling program; words beginning with "WZ" are named of external procedures called by the calling program.

Storage 17 of data processing system 10 is regarded conceptually as divided into program storage and data storage. The contents of program storage (shown in FIG. 7) will first be briefly reviewed; the contents of the data storage (shown in FIG. 6) will be described; each module of FIG. 7 will then be described in more detail; and the operation of data processing system 10 with respect to the data structures and according to the modules will then be described.

Program storage

Figure 7:
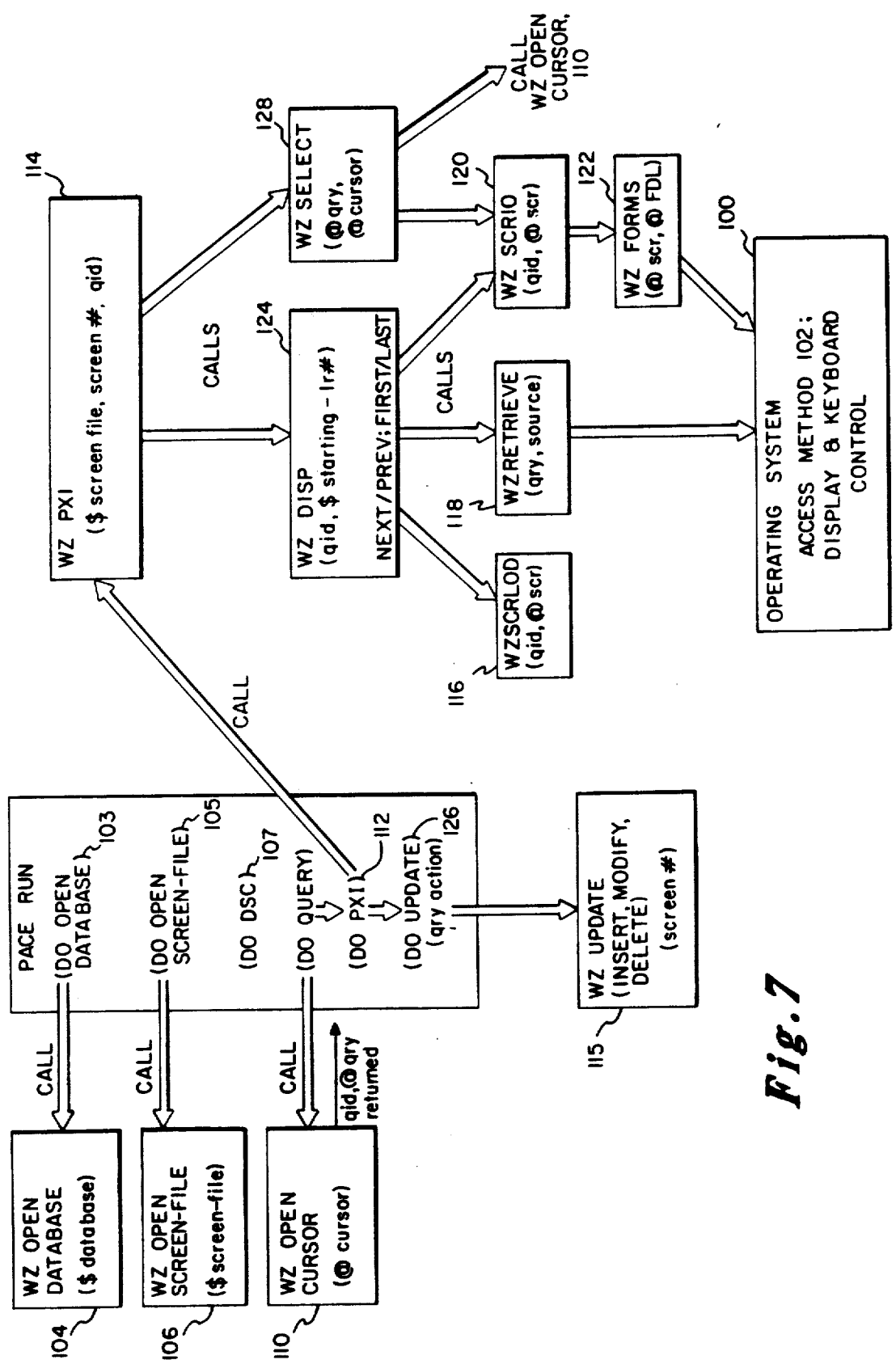
FIG. 7 is a conceptual showing of the allocation of program storage in the data processing system.

Referring now to FIG. 7, the program modules provided in program storage are shown conceptually, with an indication of the significant parameters input to each module and an indication of calls from one module to another. In addition, in certain cases parameters returned by the modules are indicated.

It will be readily understood that such modules and parameters are represented by physical signals, and that during operation, processor 12 copies from program storage signals representing appropriate program elements and uses such signals to control the physical state of hardware elements within system 10 so that the represented operation is physically carried out. It will be likewise understood that when a module is described as "calling" another modules, in fact data processor system 10, operating according to the first module, accesses the second module and copies its signals in order to control further operation according to the second module.

BRIEF DESCRIPTION OF PROGRAM STORAGE

Operating system

In the program storage portion of storage 17 there are provided signals representing an operating system program 100, which forms no part of the invention and may be of any desired design, but which must provide an access method 102 suitable for controlling data processing system 10 to retrieve record occurrences from the database in storage 17, to modify or delete record occurrences in the database, and to add new records to the database. In addition, operating system 100 must include program for the control of display 18 and keyboard 20, and specifically, must be able to respond to an appropriate command ("Write/Read Screen") in a calling program by sending signals representing a stored screen image to display 20, receiving keyboard input signals, modifying the stored screen image in accordance therewith, and in addition storing certain of the keyboard input signals.

Calling program

Program storage 17 further provides signals representing a "calling program" which calls programming elements for the operation of the data processing system. In the embodiment described herein, the calling program is titled PACE RUN, but the program for the relational operator means of the invention may be called from other programs for maintaining relational databases, and the details of such program are not pertinent to the present invention except as described herein.

The information which must initially be passed from the user of the terminal to the calling program comprises a designation of the database to be accessed, a designation of the screen file to be accessed, and in some cases a cursor. (In other cases, a cursor is provided in a manner to be explained). As understood in the art of managing relational databases, a cursor is a statement (or an implementation-dependent data structure derived from such statement) which defines a set of record occurrences to be retrieved from the physical database, and which identifies a position within the set during the process of retrieving the record occurrences.

Within the calling program (PACE RUN) are provided a DO OPEN DATABASE module 103, a DO OPEN SCREEN FILE module 105, a DO DSC module 107, a DO QUERY module 108, a DO PXI module 112, and a DO UPDATE module 113.

A WZOPEN DATABASE module 104 is called by module 103; a WZOPEN SCREEN FILE module 106 is called by module 105; and a WZOPEN CURSOR module 110 is called by DO QUERY module 108. A WZPXI module 114 is called by DOPXI module 112, and the WZDISP module 124 is called by WZPXI module 114. The modules WZSCRLOD 116, WZRETRIEVE 118 and WZSCRIO 120 are called by WZDISP module 124. WZFORMS 122 is called by WZSCRIO 120. Further, a WZSELECT module 128 is called by module 114, and calls both WZSCRIO module 120 and OPEN CURSOR module 110. A DO UPDATE module 126 is also called by DOPXI, under conditions to be described, and the WZINSERT, WZMODIFY, and WZDELETE modules 115 are called by module 126. Details of the program modules shown in FIG. 7 and of the operation of data processing system 10 under the control of signals representing them will be described in what follows.

Data storage

Figure 6:
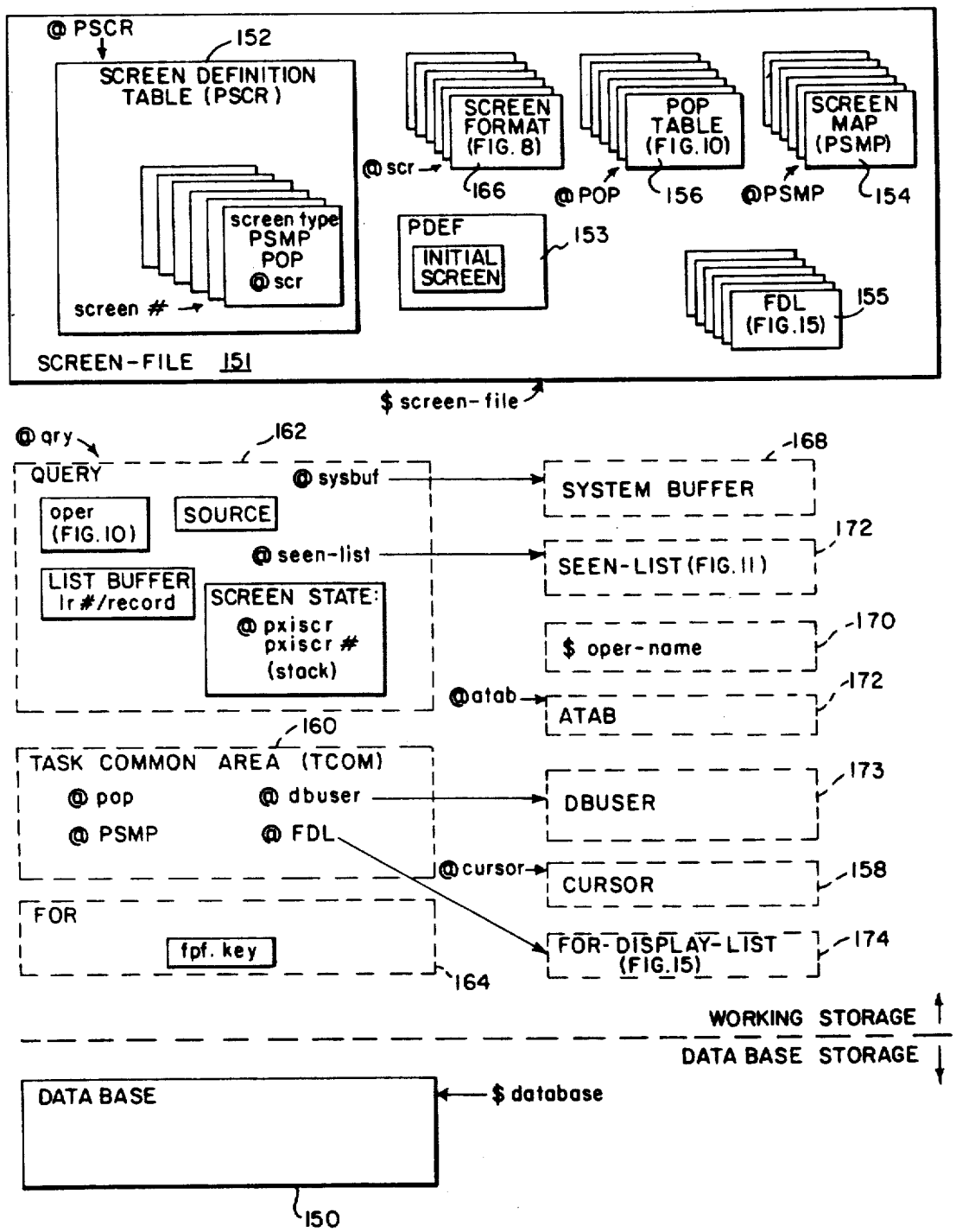
FIG. 6 is a conceptual showing of the allocation of data storage in the data processing system.

Referring now to FIG. 6, the data storage portion of storage 17 is conceptually divided into the database storage means providing signals representing the record occurrences comprising one or more relational databases 150, and working storage. The details of the database storage, as has been explained, are not visible to the user of data processing system 10, and will not be further described. The working storage is shown as providing signals representing two kinds of data structures: the signals representing those shown in solid lines are provided in storage 17, according to my invention, before operation according to my invention begins; signals representing the structures shown in dotted lines are placed into storage, or storage space is allocated for them, during the operation of data processing system 10 according to the program elements shown in FIG. 7, as will be described.

Screen-file 151: PSCR, PSMP, POP, and PDEF

Signals representing a screen-file data structure 151 are provided in storage 17, and provide predefined display format signals. Screen-file 151 may be part of the user (calling) program. It may provide display format signals for more than one target relation; for purposes of this description, however, it will be assumed that it is designed for the display of record occurrences from a particular target relation (base table or view) within the named database. More than one screen-file may be provided, if more than one target relation is to be accessed.

Screen file 151 includes PDEF table 153, which provides storage for signals representing the initial screen format to be accessed. Screen file 151 further includes Procedure Screen Definition Table (PSCR) 152; the element @pscr is a pointer which addresses PSCR 152. PSCR 152 provides stored signals relating to a plurality of screen formats, the signals for each screen being located by the screen index (screen #). For each screen there are provided in PSCR 152 signals representing the screen type (or more indicator), a pointer @scr which points to a screen format 166 (to be described below in connection with FIGS. 8, 12 and 13), and the names of a Procedure Screen Map (PSMP) and a Procedure Operator Table (POP) associated with the screen. Screen file 151 further provides, for each screen indexed in PSCR 152, signals representing a screen format 166, a POP table 156, a PSMP 154, and a portion 155 of the For-Display-List.

Figure 10:
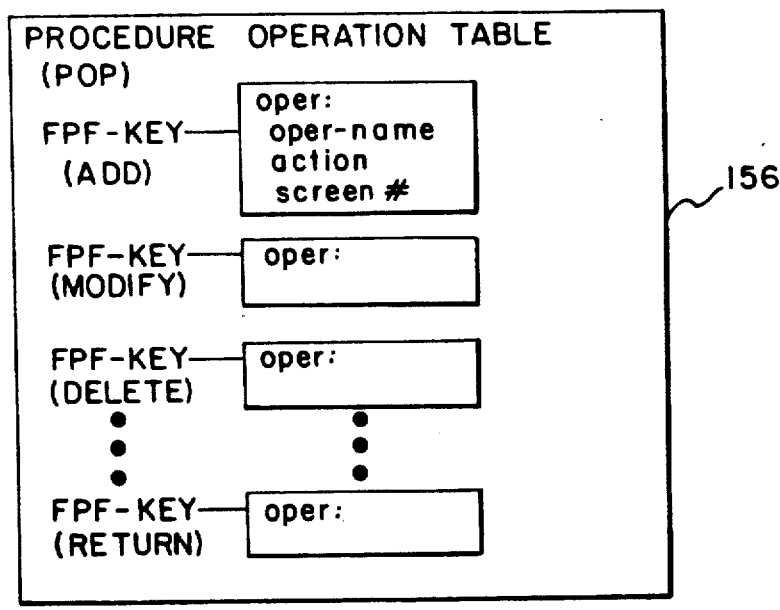

The POP table 156 for a particular screen format 166 is shown in more detail in FIG. 10. POP table 156 provides, for each screen format 166, signals representing information about the operations that may be selected from keyboard 20 while such screen is displayed; these include operations to be performed on the result relation interactively defined during display of that screen format as well as other operations such as scrolling of record occurrence representations and transitions to certain other screen formats. The table is indexed by the value of a storage element called FPFkey, to be described, and for each such value, a data structure called "oper" is provided, giving information regarding the operation which is selectable by means of a PF key on keyboard 20 in a manner to be explained. "Oper" includes the "oper-name" (text to be returned to the calling program), the action (or actions) to be taken, and the screen name of the screen format to be used for the action, when pertinent. In the POP table for the LIST screen, there is an "oper" for each of the operations Add, Modify, Delete, and Return. Other screens may have POP tables containing opers for more or fewer operations. Other operations may also be provided when the POP table is designed.

The Procedure Screen Map (PSMP) 154 for a particular screen format 166 contains signals representing a list of the names of view-fields that are to appear on the display when the screen format is used to display record occurrences from the database. This information is used when filling out the For-Display-List 155/174. Further, PSMP 154 for a particular screen format 166 provides a screen limit signal, defining how may record occurrences can be displayed at one time on such screen.

Screen formats

Figure 12:
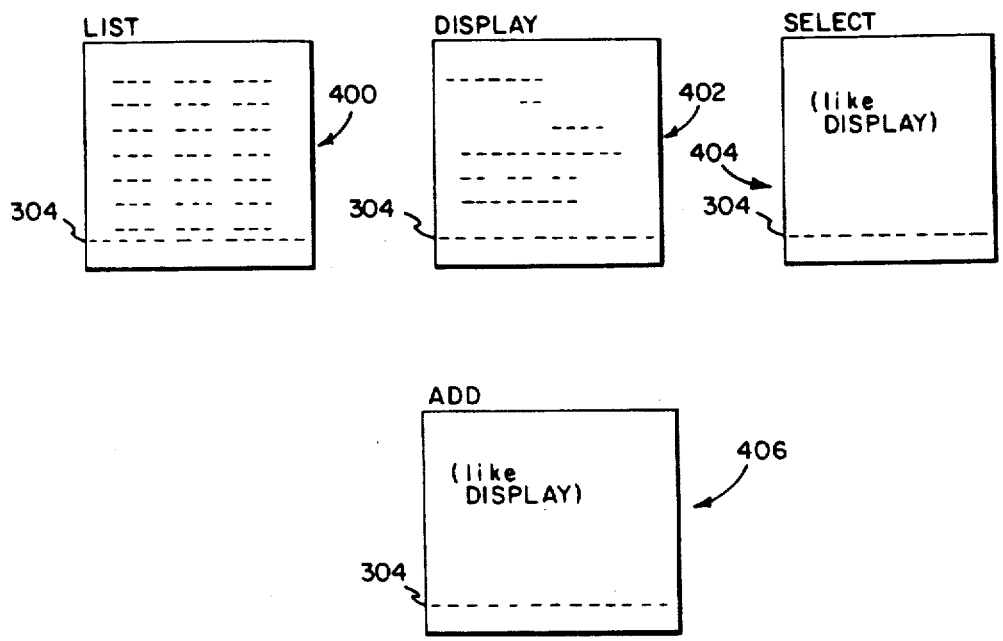
FIG. 12 shows simplified views of the types of screen format employed in my invention.
Figure 4:
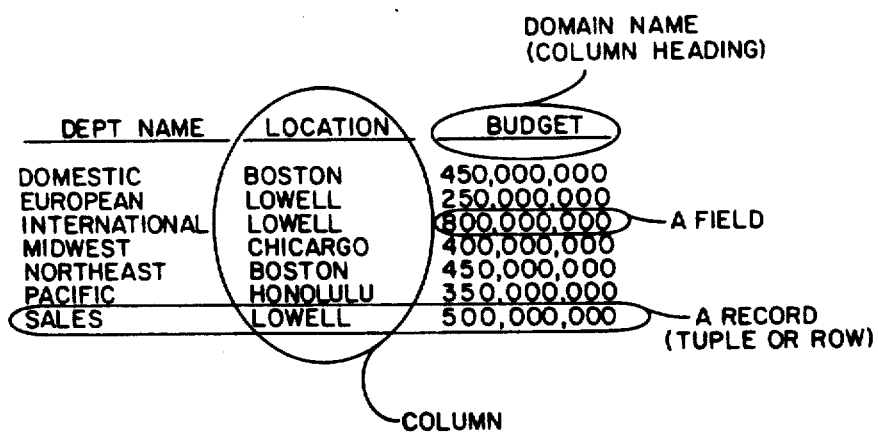
FIG. 4 shows the components of a typical relation of a relational database.

Referring now to FIG. 12, each screen-file may contain signals representing up to six screen formats (shown together as formats 166 in FIG. 6); however, there are only two basic types. The formats are shown schematically in FIG. 12 so that the difference between the two types can be easily seen. The LIST screen format 400 is adapted to show representations of many record occurrences from the database target relation, and therefore provides spaces for the fields of such occurrences, arranged in columns. Fewer than all fields may be shown. The DISPLAY screen format 402 is adapted to show a representation of a single record occurrence from the database target relation, and can show more of the fields of that record occurrence. The formats of the SELECT screen (404) and the ADD, MODIFY, and DELETE screens (406) are basically similar to the formats of the DISPLAY screen, in that representations of the fields of a single record, or of the names of the fields of a single record, are shown, with differences to be described.

LIST Screen Format

LIST screen format 400 is shown in FIGS. 8a and b in greater detail.

FIG. 8a shows LIST screen format 400 as initially provided in screen-file 151. The title 300 of the screen is provided, with the name of the target relation at 310 and fixed text at 302. Below the fixed text are column headers and empty spaces for the display of record occurrences. A line 304 divides the screen into upper and lower portions 306 and 308. Below line 304, in lower portion 308, are displayed the numbers of particular PF keys among the sixteen keys 204 of keyboard 20 (FIG. 5), together with the name of ENTER key 206 on keyboard 20. Names of selectable operations are represented in association with the key designations.

It will be observed that not all of the sixteen possible PF keys are listed in lower portion 308 of the screen format; this is because only a smaller number of operations are selectable while the LIST screen is displayed. Among those listed is PF key 204-16:Return. Actuation of Key 204-4:Prev causes a previously displayed screenload of record occurrences in the list to be redisplayed, still using the present format; actuation of key 204-4 with the shift key causes the first screenload of record occurrences in the list to be displayed. Actuation of key 204-5 similarly causes the next screenload to be displayed, and actuation of key 205-5 with the shift key causes the last screenload of occurrences to be displayed. Keys 204-4 and 204-5 thus scroll portion 306. Actuation of key 204-7 causes SELECT screen format (described below) to be displayed. Actuation of keys 204-8 and 204-9 causes one or more of the displayed record occurrences, selected by the user by moving the screen-position-marker, to be displayed in the DELETE and MODIFY screen formats, to be described. (If more than one record occurrence has been selected, they will be displayed sequentially on the selected screen.) Actuation of key 204-6 causes the ADD screen format (described below) to be displayed. Actuation of ENTER key 206 (on keyboard 20, FIG. 5) causes a transition to the DISPLAY screen format, in which an enumerated record occurrence is represented.

The displayed key identifiers including PF key numbers of key names, with corresponding operation names, provide representations of a plurality of selectable operations, including operations executable with respect to the members of the result relation to be provided by the relational operator means, as will be described.

In FIG. 8b, the retrieved record occurrences are represented below the column headers.

Other formats

Referring now to FIGS. 13 and 14, the remaining screen formats are shown in more detail than in FIG. 12.

FIG. 13 shows DISPLAY screen format 402, with representation of the fields of a single record occurrence. This screen format is shown in response to actuation of ENTER key 206 (on keyboard 20, FIG. 5) while the LIST format is displayed. The names of the fields in the record are given to the left of the values of the fields. Selectable operations are displayed in lower portion 308 of the format. Actuation of PF key 204-16 (Return) causes a return to a view of the LIST screen format. Actuation of PF keys 204-6 (Add), 204-8 (Delete), and 204-9 (Modify) permits the user to view the same record occurrence that is displayed in the DISPLAY screen format, but displayed in one of formats 406, so that the indicated operation can be performed.

SELECT screen format 404, which is shown in response to actuation of PF key 204-7 while the LIST format is displayed, is similar in arrangement to format 402, but the values of some or all of the fields are represented by question marks and blanks. This screen permits the user to position the screen-position-marker at a particular field (open element) and to enter a characterizing value into the field, for the purpose of selecting from the target relation (named at 310) in the database, record occurrences which have that value in the selected field. More than one field may be so characterized.

Referring now to FIG. 14, the Update screen formats 406 are shown. ADD screen format 406-1 is similar to the SELECT screen format, but in this case, the user must in all the fields necessary to constitute a new record occurrence to be added to the target relation (named at 310) of the database. MODIFY screen format 406-1 is similar to DISPLAY format 402, but the representations of the values of the fields are shown highlighted (or otherwise distinguished from the attribute names), to indicate that the user can modify these values, for the purposes of modifying in the database the record occurrence represented on the screen. DELETE screen format 406-3 is again similar to DISPLAY format 402, but the selectable operations include "Delete" or "Skip record".

Cursor 158

Referring again to FIG. 6, signals representing a cursor are provided in storage at 158, with a pointer @cursor. The particular cursor represented in storage element 158 may be either provided by the calling program or derived from an initial cursor in a manner to be described, or otherwise defined. As previously stated, a cursor is a statement (or an implementation-dependent data structure derived from such statement) which defines a set of records to be retrieved from a target relation in the database, and which identifies a position within the set during the process of retrieving the records.

Other data structures

Still referring to FIG. 6, storage for the data structures Task Common Area (TCOM) 160, QUERY 162, Seen-List 176, ATAB 172, For-Display-List (part two) 174, DBUSER 173, and FOR 164 is allocated during operation of data processing system 10, as will be described. In addition, storage for a System Buffer 168 is allocated during operation, as will be described.

Description of program modules and interaction with storage

WZOPEN DATABASE 104

Figure 2:
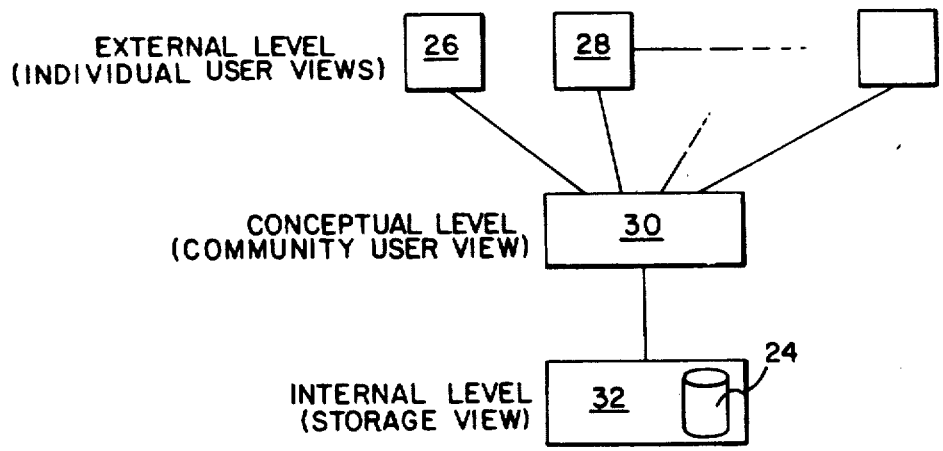
FIGS. 2 and 3 are conceptual diagrams showing the relationship between the physical records comprising the database, and the user of the data processing system.
Figure 3:
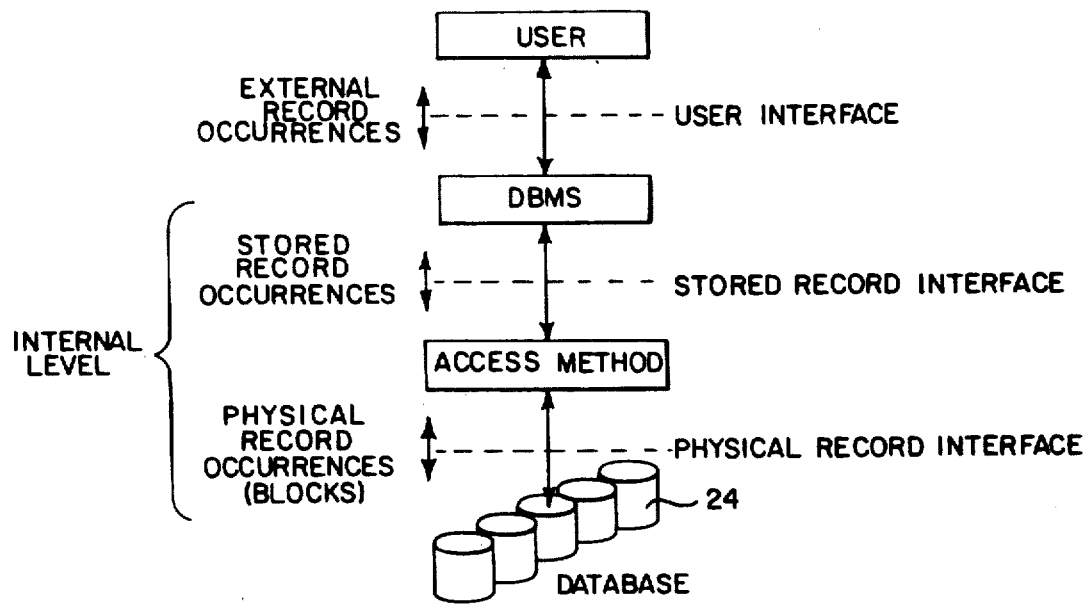

Data processing system 10 operates under control of signals representing program element WZOPEN DATABASE 104, called from the calling program, with respect to a particular database (named by the parameter $database). The information as to which database is to be accessed ultimately comes from the user of the data processing system terminal. Operating according to module 104, data processing system 10 allocates space in storage 17 for the data structure DBUSER 173, which provides signals representing pointers to lists of descriptors of database records, files, relationships, and views, and other data pertinent to the opened database. Such descriptors provide signals for defining the conceptual records of level 30 (FIG. 2) in terms of the stored or internal record occurrences of level 32. Data processing system 10 then allocates in storage 17 space for signals representing the structure Task Common Area (TCOM) 160, which contains storage for various pointers to be used in subsequent operation, and in particular, contains storage for the pointer @for-display-list, which points to For-Display-List (part two) 174, and the pointer @dbuser, which points to DBUSER data structure 173.

Apart from the above, the procedure of opening a database so that record occurrences may be retrieved from it is well understood in the database management art and will not be particularly described herein.

WZOPEN SCREEN FILE 106

Data processing system 10 operates according to signals representing program element WZOPEN SCREEN FILE 106, called from the calling program, with respect to the parameter $screen-file (supplied ultimately by the user). The parameter $screen-file names the particular screen-file 151 to be accessed. If signals representing the particular screen-file referred to are not present in main memory 14, data processing system 10 loads signals representing PSCR 152 from secondary memory 16 at this time under the control of WZOPEN SCREEN FILE module 106; this operation forms no part of the invention.

DO DSC 107

Operating according to signals representing the DO DSC module 107 within the calling program, data processing system 10 defines an initial cursor, and places signals representing it in the data structure CURSOR 158 within storage 17. The cursor is defined against a target comprising at least one of the relations within the named database. The target may be either a base table (represented in storage by a distinct stored file) or a view (a view is a table [relation] that does not have any existence in its own right but is instead derived from one or more base tables.

DO QUERY 108

The module DO QUERY 108 within the calling program for purposes of the present description serves only to control data processing system 10 to call WZOPEN CURSOR module 110 and DOPXI module 112.

OPEN CURSOR

The module WZOPEN CURSOR(@cursor, $qid) 110 is employed to control data processing system 10 to open the cursor defined by signals in data structure 158. The procedure of opening a cursor for the purpose of fetching multiple record occurrences defined by the cursor is in general well understood in the art of database management, and will not be described in detail herein.

In the particular embodiment described herein, data processing system 10 operating under the control of signals representing WZOPEN CURSOR module 110 allocates space within storage 17 for the QUERY data structure 162, corresponding to the cursor pointed by @cursor. A single QUERY data structure corresponds to a single cursor. QUERY data structure 162 is pointed to by @qry, and contains signals representing the pointer @sysbuf, which points to System Buffer 168, pointer @pxiscr, which points to the screen format to be used during operation according to my relational operator or to the screen most recently used (to permit returns), pointer @seen-list, which points to Seen-List 176 (to be described), and others. Further, QUERY data structure 162 provides storage for a data element called "oper", a buffer called List-Buffer, and the data element "source", all of which will be described in what follows.

Data processing system 10 under control of WZOPEN CURSOR module 110 returns the identifier "qid" for the QUERY. Further operating under control of WZOPEN CURSOR module 110, data processing system 10 selects an access strategy to be used in retrieving physical record occurrences from database 150, as defined by the cursor; the process of selecting an access strategy is well understood in the database management art and will not be described herein.

DO PXI 112

Operating under the control of signals representing the module DO QUERY 108, data processing system 10 calls DOPXI(screen#) module 112, and after performing certain operations not pertinent herein, called WZPXI($screen-file, screen#, $qid) module 114. "$screen-file" is a parameter which names the screen-file to be referred to; "screen#" is an index to the particular screen format within the screen-file. As stated in connection with Screen-File 151, the name of the initial screen to be accessed is provided by the calling program, and signals representing the name are stored in "initial-screen"- within PDEF 153 in Screen-File 151. Names of screens accessed in subsequent operations are provided in a way to be described in what follows. As noted above, "qid" is the identifier for the QUERY. Operation according to WZPXI will be described below: it returns a value by placing signals representing such value within data structure ATAB 172 (FIG. 6). This value represents one of the operations Add, Modify, Delete, or Return; other operations may also be provided. In addition, WZPXI may return signals representing the characters of "oper-name" within the storage element 170 pointed to by $oper-name; this pointer is supplied by the calling program if desired. Either or both of the values in ATAB 172 and the characters comprising "oper-name" are available to the calling program for further testing; they may be used in different circumstances, not pertinent herein.

Upon return from WZPXI, data processing system 10 under the control of DOPXI tests the signals representing the value returned from WZPXI within data structure ATAB 172. For the actions Add, Modify, or Delete, data processing system 10 under control of DOPXI calls appropriate program modules (shown as DO UPDATE module 126 and WZINERT, DELETE, MODIFY module 115 called by module 126) in order to carry out the indicated operation.

WZPXI 114

Under the control of module WZPXI($screen-file, screen#, $qid) (114) data processing system 10 tests the signals representing the screen type (mode indicator) of the screen pointed to by "initial screen" in PDEF 153 (for the first iteration of WZPXI) or the screen type of the screen pointed by qry.@pxiscr (for subsequent iterations).

Ignoring for the moment the possibility that the screen type is SELECT (which will be discussed below), if the screen type is either LIST or DISPLAY, module WZDISP 124 is called. Operation according to WZDISP module 124 will be described below; during such operation, representations of one or more record occurrences defined by the cursor are displayed in either the DISPLAY (one occurrence) or the LIST (multiple occurrences) screen formats. When such operation is completed, signals have been placed in qry.oper representing an operation selected by actuation of a PF key by the terminal user.

When data processing system 10 returns from WZDISP module 124, operating further according to WZPXI module 114, it tests the signals stored in the storage element qry.action (within qry.oper). Certain actions (including a transition to a SELECT screen, discussed below) may be executed by data processing system 10 operating further according to WZPXI module 114; such operation includes resetting qry.@pxiscr and qry.pxiscr# to keep track of the transition. Otherwise, data processing system 10 operating further according to WZPXI module 114 copies signals representing qry.oper-name (within qry.oper) from QUERY data structure 162 to the location 170 pointed to by $oper-name, places signals representing the action into ATAB 172, sets qry.source to indicate either selection through the DISPLAY screen, selection through the LIST screen from the cursor, selection through the LIST screen by the marked screen list, or selection through the SELECT screen. The operation represented by signals in $oper-name and ATAB 172 may be Add, Modify, Delete, or Return. (The possibility that the operation is Select will be discussed below.)

WZDISP 124

Operating according to WZDISP module 124 with respect to the parameters $qid and $starting-lr#(l1# = list record number, stored in qry.List-Buffer; the starting-lr# is provided by WZPXI based on the screen state), data processing system 10 calls WZSCRLOD($qid, @scr) module 116 to complete the For-Display-List, as will be described, and then calls WZRETRIEVE(qry.source) module 118 to obtain a record occurrence to be displayed. Operation according to WZRETRIEVE will be described below. For the LIST screen, WZRETRIEVE is called repeatedly; record occurrences are retrieved one at a time until either a full screenload has been retrieved (as defined by the screen limit signal in the PSMP 154 for the screen), or there are no more record occurrences to be retrieved, that is, all those defined by the cursor have been retrieved. As each record occurrence is retrieved, signals representing its keys are placed in Seen-List 176.

Upon return from WZRETRIEVE module 118, further operating according to WZDISP module 124, data processing system 10 calls WZSCRIO module 120 to cause representations of the retrieved record occurrences to be displayed. Operation according to WZSCRIO will be described below. Upon return from WZSCRIO module 120, data processing system 10 operating further according to WZDISP module 124 tests the signals stored in qry.action (within qry.oper).

If the action is a transition from DISPLAY to LIST format (selected by actuation of PF key 204-16:Return on DISPLAY format 402, FIG. 13) or from LIST to DISPLAY format (selected by actuation of ENTER key 206 on keyboard 20, LIST format, FIG. 8), data processing system 10 resets qry.@pxiscr and @scr to point to the new screen; the index qry.pxiscr# is used to keep track of transitions between screen formats. For such a transition operation, operating then further according to WZDISP and modules called therefrom, responsive to the screen-type of the screen format indicated by the reset pointers, data processing system 10 displays representations of the retrieved record occurrence or occurrences in the appropriate screen format.

If the action in qry.action is Next, Previous, First, or Last, the indicated scrolling operation is carried out by data processing system 10 while operating according to WZDISP module 124. Next or Previous causes the next or previous screenload of representations of record occurrences to be displayed; First or Last causes the first or last screenload to be displayed. If a previous screenload is to be displayed, the record occurrences are found using the keys stored in Seen-List 176; otherwise record occurrences must be retrieved using the QUERY data structure 162. These operations result in scrolling the displayed list of record occurrences.

It will be evident that the user can select unlimited successive operations of scrolling or transition between LIST and DISPLAY screen formats without causing data processing system 10 to return from WZDISP module 124. The PF key Return causes a return to the previously displayed screen format, if any (as indicated by qry.pxiscr#), or else a return to the calling program.

WZSCRLOD 116

Figures 9, 15:
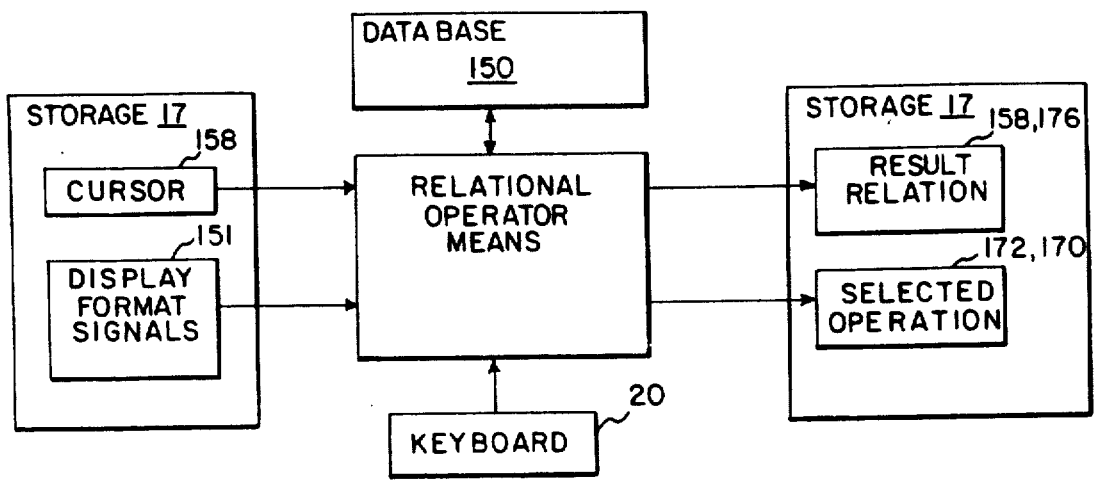
FIG. 9 is a conceptual (black box) showing of the relational operator means of my invention.
FIG. 15 shows a portion of FIG. 6 in more detail.

Operating according to WZSCRLOD($qid, $scr) module 116, data processing system 10 accesses the appropriate POP table 156 and PSMP 154 for the particular screen format 166 pointed to by @scr, and fills out the right hand portion of the For-Display-List. Referring now to FIG. 15, the left hand portion of the For-Display-List is provided by data structure 155 within Screen-File 151; for each view field to be displayed on the screen, the location (row and column on screen), the length, and other appropriate information is provided. The right hand portion is provided by data structure 174; for each view field, the memory location, length, type, and other appropriate information about the record occurrence is provided. Portion 174 thus provides the addresses of record occurrences to be displayed; for a LIST screen format, these addresses are to the qry.List-Buffer, while for a DISPLAY screen format the addresses are to System Buffer 168. Display of representations of attribute names as headers 303, view name as view title 310, the appropriate PF keys 204 for the operations selectable during display of the particular screen format 166, and other information is provided for by screen format 166.

WZRETRIEVE 118

Operating according to WZRETRIEVE(qry.source) module 118, data processing system 10, taking into account the signals in qry.source, calls access method 102 of operating system 100. Access method 102 is responsive to signals provided by data processing system 10 operating according to WZRETRIEVE module 118 to cause data processing system 10 to retrieve from the target within the named database 150 one record occurrence specified by the cursor and to store signals representing the retrieved record occurrence in System Buffer 168.

For the LIST screen (which displays a plurality of record occurrences), since System Buffer 168 holds only one record occurrence, signals representing the retrieved occurrences are copied to qry.List-Buffer by data processing system 10 operating according to WZDISP module 124. WZRETRIEVE is repeatedly executed until there are no more record occurrences defined by the cursor, or until enough record occurrences have been retrieved to fill the screen, as defined by the screen limit indicator in PSMP 154.

WZSCRIO

Operating according to WZSCRIO(@qry=$qid, $scr) module 120, data processing system 10 calls WZFORMS(@for-display-list) module 122 to merge the record occurrences pointed to by the For-Display-List (FIG. 15) with the screen format pointed to by @scr, for display to the user. The operation of data processing system 10 according to WZFORMS will be described below; when such operation is complete, signals have been placed in for.fpf-key, and the stored screen image may have been modified corresponding to user input signals. Upon return from WZFORMS, operating further according to WZSCRIO, data processing system 10 uses the signals stored in for.fpf-key (as will be described) as an index to the signals within the POP table data structure 156 for the screen that has been displayed, and copies therefrom signals representing the element "oper", containing "oper-name" and "action", corresponding to the PFkey number, into the storage element qry.oper within QUERY data structure 162.

The signals stored in qry.oper are output signals of the relational operator means, representative of the operation selected by the user.

Figure 11:
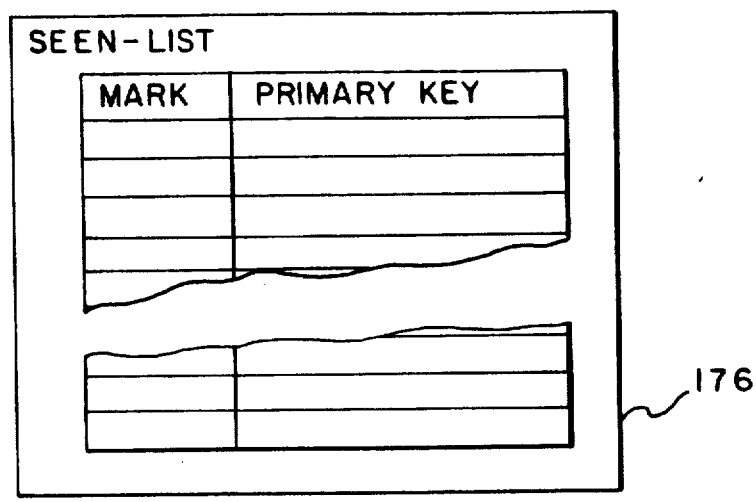
FIGS. 10 and 11 are conceptual showings of portions of FIG. 6 in more detail.

Further operating according to WZSCRIO module 120, data processing system 10 modifies Seen-List 176 by marking records (by setting a flat in the "Mark" column of the list, as seen in FIG. 11) that have been enumerated by the terminal user, as will be described. Processing system 10 returns from WZSCRIO module 120 to WZDISP module 124.

WZFORMS 122

Under control of WZFORMS(@for-display-list, @scr) module 122, data processing system 10 uses the signals representing the addresses in For-Display-List 155/174 to obtain the record occurrence signals from the addressed buffer, and to merge them with the predefined display format signals of Screen-File 151 in order to modify screen format 166 and thereby to define a resultant stored screen image. For the LIST screen, the record occurrence signals are taken from qry.List-Buffer; for the DISPLAY screen a single record occurrence is taken from System Buffer 168.

Further under control of WZFORMS 122, the data processing system calls Operating System program 100, and operates according to the display control signals therein to control display 18 to display a representation of the resultant screen image stored at 166. Further, during this display, the data processing system enables keyboard 20. The user of the console or terminal may used keyboard 20 to provide input signals.

If on the LIST screen the screen-position-marker is positioned by the user next to the representation of a particular record occurrence, and a PF key 204 is actuated, by default that record occurrence is taken to be enumerated. Alternatively, the user may enter an "X" or other character next to one or more record occurrences to enumerate them.

The keyboard signals provided by the user are interpreted by the data processing system, operating according to operating system 100, to modify the stored screen image. A signal corresponding to the actuated PF key is also stored. After return from WZFORMS, data processing system 10, under the control of WZSCRIO and WZDISP, interprets the user's input keyboard signals are enumerating signals, effecting enumeration of certain of the retrieved record occurrences whose representations are displayed, and operation selection signals, effecting selection of one of the plurality of selectable operations. Selectable operations are defined for each screen format, but always include Return.

Further operating according to WZFORMS module 122, the data processing system copies the stored signals representing the PF key number to the data storage element for.fpf-key within FOR data structure 164.

When the PF key signals have been copied for.fpf-key, the data processing system returns from the module WZFORMS 122 to the module WZSCRIO 120.

Operation

In operation according to the signals representing the modules and data structures that have been described, the user of the data processing system terminal selects a database to be accessed and a screen file to be used for the purpose (defined for a particular base table or view). This may be done interactively through the keyboard, or by a calling program. The database 150 and screen file 151 are opened by data processing system 10, which allocates storage space for the DBUSER data structure 173 and TCOM data structure 160. The user formulates a query to the database, represented by a cursor. Data processing system 10 opens the cursor and allocates storage for QUERY data structure 162, determines the strategy for obtaining record occurrences from database 150, and defines qid.

Operating according to WZPXI with a LIST screen format indexed by screen #, data processing system 10 calls WZDISP(qid) module 124. Operating according to WZDISP, data processing system 10 calls WZRETRIEVE(qry.source) which then calls access method 102 within operating system 100, to retrieve from the target signals representing a record occurrence defined by the cursor, and to store them in System Buffer 168. For a LIST screen, multiple record occurrences are retrieved and their signals are stored in qry.List-Buffer.

Upon return from WZRETRIEVE, data processing system 10 calls WZSCRLOD module 116 to complete For-Display-List 155/174, and then calls WZCRIO module 120; operating according to this module data processing system 120 calls WZFORMS module 122. Operating according to WZFORMS, data processing system 10 uses the address signals in For-Display-List 155/174 to merge the predefined display format signals from LIST screen format 400 stored at 166 within screen-file 151 with the retrieved record occurrence signals stored in qry.List-Buffer, in order to modify the LIST screen format and thereby to define a resultant stored screen image.

Operating according to operating system 100, data processing system 10 then controls display 18 to display a representation of the defined resultant screen image. During this display, system 10 enables keyboard 20. The user may use keyboard 20 to provide enumerating signals, effecting enumeration of certain of the retrieved record occurrences whose representations are displayed; further, by actuating a PF key, the user provides operation selection signals, effecting selection of one of the plurality of selectable operations displayed on the LIST screen.

When a PF key has been actuated, assuming that some records have been enumerated, the data processing system 10 operates according to operating system 100 to modify the defined screen image to correspond with the user's input signals. Further, data processing system 10 causes signals representing the number of the actuated PF key to be stored.

Further operating according to WZFORMS module 122, data processing system 10 copies the PF key signals to the data storage element for.fpf-key within FOR data structure 164. Upon return from WZFORMS, operating further according to WZSCRIO module 120, data processing system 10 uses the signals stored in for.fpf-key as an index to the POP table data structure 156 corresponding to the LIST screen, and copies therefrom the signals of the "oper" corresponding to the actuated PF key into the storage element qry.oper within QUERY data structure 162. The signals in qry.oper-action are output signals of the relational operator means, representative of the operation selected by the user. Further operating according to WZSCRIO module 120, data processing system 10 sets mark flags within Seen-list 176 to mark enumerated records as indicated in the modified screen image.

Upon return from WZSCRIO, further operating according to WZDISP module 124, data processing system 10 tests the signals stored within qry.oper-action. If the action is Next, Prev, First, Last, Return (from Display to List) or Display, system 10 can execute the selected operation while operating according to WZDISP module 124. These actions can be selected as frequently as the user desires, and in any sequence, in order to allow the user to obtain a display of desired record occurrences before enumerating a set and performing operations such as Modify and Delete on the selected occurrences.

If the action is not one of Next, Previous, First, Last, Return to LIST from DISPLAY, or DISPLAY from LIST, data processing system 10 returns to WZPXI module 114. If the action is Modify, Delete or Add, (or other action defined in the POP table but not described herein), WZPXI module 114 returns to the calling program to interpret the action. The specific calling program shown in the present embodiment calls modules 126 and 115 in order to execute the Modify, Delete and Add operations, with the appropriate screen formats from screen-file 151.

If the user enumerates more than one record occurrence on a LIST screen, and then actuates a PF key selecting Delete or Modify, a representation of each enumerated record in turn will be displayed on the indicated screen until all have been displayed.

As a result of the operation that has been described, there is provided an enumerated relation, derived interactively from the initial cursor provided by the calling program in accordance with the user's enumerating signals input through keyboard 20. The enumerated relation (of one member) can be defined by the user through the LIST screen, as has been described, by positioning the screen-position-marker next to the representation of a record occurrence and actuating a PF key; alternatively, the enumerated relation (of one or more members) can be defined by entering a character next to one or more record occurrence representation and actuating a PF key. Finally, the actuation of a PF key by the user while the DISPLAY screen is displayed results in defining an enumerated relation comprising the single record occurrence that is displayed. Further, there is provided an output signal representative of an operation selected by the user from the displayed selectable operations. In all these cases, the enumerated relation is specified by signals representing a "modified cursor" comprising the enumerating marks in the Seen-List. Further operation according to the calling program, which receives signals representing the "modified cursor" and the selected operation, is thus independent of the manner in which the enumeration was accomplished.

SELECT Screen

In addition to the means for defining an enumerated result relation, according to my invention there is provided means for interactively defining a characteristically defined result relation, that is, a relation, membership in which is defined in terms of record occurrence attributes that are explicitly defined and present in the database target. This is accomplished by means of SELECT screen format 404 and WZSELECT module 128, together with elements already described.

Referring now again to FIG. 7, signals representing a further program module, WZSELECT 128, are provided in the program portion of storage 17 within data processing system 10. When data processing system 10 operates according to WZPXI module 114, as has been described, it tests the signals representing the screen-type (mode indicator) of the screen indexed by screen# within Screen-File 151 (indicated by qry.@pxiscr). If the screen is a SELECT screen, WZPXI calls WZSELECT module 128. Qry.@pxiscr is set to indicate a SELECT screen during operation according to WZDISP module 124, if the user actuates PF key 204-7 while the LIST screen is displayed. WZPXI uses the value of qry.pxiscr# to keep track of transitions between the SELECT screen and the LIST/DISPLAY screens.

Data processing system 10 operates according to WZSELECT module 128 with respect to the signals representing input parameters @qry and @cursor, and calls WZSCRIO module 120 to display SELECT screen format 404 (FIG. 13). The format includes the names of the target relation and view-fields for the target relation.

Operating according to WZSCRIO module 120, data processing system 10 calls WZFORMS module 122, and operates in accordance therewith in the manner that has been described, to display a representation of the SELECT screen format 404, including the target view name at 310 and the view-field names in portion 306. The view name and view-field names are generic elements. Any value of an attribute (field) that was previously made part of the cursor, as a search criterion, is represented on the SELECT screen next to the field name; the remaining fields are shown blank.

The fields, whether blank or displaying previously entered search criteria, are open elements, that is, the user can enter characterizing elements into the open elements. The user can position the screen-position-marker to a desired field, and can enter a value into that field using the typewriter keys 200 of keyboard 20 (FIG. 5) to provide characterizing signals. The display will be altered accordingly. This can be done to more than one of the displayed fields, if desired. The characterizing values entered by the user into the open elements provide new search criteria, further refining or characterizing the cursor with respect to the attributes of the record occurrences in the target relation of the named database.

Finally the user actuates one of the PF keys corresponding to the displayed selectable operations. Selectable operations on the SELECT screen include List, Delete and Modify. Signals representing the actuated PF key are stored in for.fpf-key in the manner previously described, and data processing system 10, operating according to WZXCRIO module 120 in the manner previously described, copies the POP.oper signals for the actuated key to qry.oper.

However, operating further according to WZSELECT module 128, data processing system 10 derives a new cursor by modifying the signals of the CURSOR data structure 158 to reflect the characterizing values entered by the user into the displayed view fields. Data processing system 10 then closes the original cursor (by calling and operating according to an appropriate module, not shown, but conventional in design) and then calls WZOPEN CURSOR module 110. Operating according to the signals of module 110, data processing system 10 allocates storage for a new QUERY data structure 162, corresponding to the new (modified old) cursor. Data processing system 10 then returns from WZSELECT module 128 to WZPXI module 114. Data processing system 10 sets qry.srouce to reflect the screen type pointed to by qry.@pxiscr.

The result of the operation according to the WZSELECT module is that there is interactively provided a result relation, defined *characteristically*, that is, in terms of attributes represented explicitly in the record occurrences within the target relation of the database. Further, there are provided output signals representative of an operation selected by the user from the displayed selectable operations, including operations performable by data processing system 10 on the result relation.

If the actuated PF key selected the LIST operation, WZPXI, responsive to the screen-type of the LIST screen, will call WZDISP module 124 in the manner previously described, for the display on the LIST screen of the record occurrences defined by the redefined cursor. The user can now enumeratively define a relation, derived from the redefined cursor. If the actuated PF key selected either Delete or Modify, representations of the record occurrences specified by the redefined cursor will be displayed sequentially on the appropriate screen, permitting such action to be taken by the user with respect to each record occurrence in the database.

In preferred embodiments, the relational operator means of my invention comprises means for providing an output signal representative of an operation selected from a plurality of selectable operations displayed to the user, together both with means for providing a result relation, membership in which is defined enumeratively and interactively through the keyboard, and with means for providing a result relation, membership in which is defined characteristically and interactively through the keyboard. However, either means for providing a result relation may be provided without the other, and considerable advantages in the interactive maintenance of relational databases may be realized thereby.

If means to define both enumeratively and characteristically defined result relations are to be provided, then the WZPXI module 114 must provide signals representing instructions of the following general form (the terminology is not that of any standard programming language):

set pxi-handled action=yes
loop while pxi-handled action=yes:
    test screen type of screen pointed to by qry.@psixcr
    if type is SELECT, call WZSELECT (that will set qry.action)
    if type is DISPLAY or LIST, call WZDISP (that will set qry.action)
    test qry.action
    if action is Select, List or Display, get the appropriate screen (and loop)
    else if action is other, set pxi-handled-action=no, (exit loop) return to DOQUERY.

Operating according to the calling program which has called the modules described herein for the operation of my relational operator means, data processing system 10 can obtain signals representing the selected PF key operation from $oper-name. Such signals are also provided in ATAB data structure 172. (The signals are provided in two forms for reasons not pertinent to the present description.) Data processing system 10 can then proceed with further operation as controlled by the calling program.

The relational operator means has provided a result relation, derived interactively from the initial cursor provided by the calling program in accordance with the user's signals input through keyboard 20. The result relation may be either an enumeratively defined relation, specified by a "modified cursor" comprising the enumerating signals (represented as the marks in Seen-List 176, FIG. 11) or a characteristically defined relation, defined by the modified cursor signals in CURSOR data structure 158.

In either case, the interactively defined result relation has the characteristics of a relation as defined in the context of relational databases, that is, further operations, designed and built for use on relations, can be carried out on the result relation. In particular, the records of the result relation can be retrieved under the control of modules designed for the retrieval of records in a relation. Moreover, the result relation can be operated on by the calling program in any desired manner without regard to the specific way in which it was defined, making the calling program independent of the physical structure that was used (keyboard, touch screen, or the like), as well as independent of whether the result relation was enumeratively or characteristically defined. This provides great flexibility in the use of such result relations.

Referring now to FIG. 9, my relational operator means is shown conceptually as a "black box". The inputs to the black box are the cursor signals, provided, as has been described, by the calling program (or defined by WZSELECT module 128 in the particular case when the initial screen is a SELECT screen, as has been described), and display format signals, which have been predefined and stored in Screen-File 151. The signals from keyboard 20 are further input to the black box, which produces output signals representing a result relation, together with a selected operation (selected from among those presented to the user for selection by PF key actuation). The signals representing the result relation are stored in CURSOR data structure 158, and also in Seen-List 176 (for the enumeratively defined result relation); the signals representing the selected operation are stored in data structures ATAB 172 and $oper-name 170.

Since the relational operator means of my invention in effect operates to transform an input relation (defined by the cursor) into a result relation, this operator means is closely analogous to the well known relational operators, defined for operation on the tables of relational databases, namely PROJECT, SELECT and JOIN. (Other relational operators have also been defined by various writers.) A necessary characteristic of a relational operator is that it operate on a relation to produce another relation, which can itself be operated on by a relational operator. This characteristic is otherwise expressed (in mathematical terms) as the statement that the set of possible relations is closed under the operation of a relational operator. Note that the result relation need not be a physical or base table within the database, but it must conform with the definition of a relation.

The operator means of my invention complies with this requirement, and thus can be regarded as a relational operator. This feature of the operator means makes it possible to employ this means as part of a sequence of relational operators. Further, it makes it possible to fetch form the database the records of the result relation, using the same operation that is used to fetch records of any relation defined in the usual way by a cursor. This provides economy of programming and simplicity of operation.

However, each standard operator, when applied to a relation, implicitly defines a result or product relation, membership in which is determined by the value of one of the attributes of the records within the initial relation defined by the cursor. That is, membership in the result relation is defined "characteristically", by means of a characteristic or attribute of the records that is explicitly present in the database. For example, it is possible to SELECT from a table of customers those customers having green hair, only if hair color has been defined as an attribute for that relation.

In contrast, my relational operator means provides for the definition of a result relation, membership in which is defined "enumeratively", that is, by means of enumeration by the user through the keyboard, and such membership may therefore be independent of the record occurrence attributes explicitly defined and present in the stored database, but may depend on some aspect of the entity underlying the record, perhaps known only to the user.

Therefore, my novel operator means makes it possible to construct interactively an arbitrary set, enumerated by the user, and thereafter to treat the set as a member of the class of relations, with all the advantages of data manipulation which result from this. In prior art data management systems, a table of enumerated members could be built, but only by explicit programming (in the applications program) designed for such purpose, and the constructed table could not then be treated as a member of the set of relations. Consequently, for example, the records could not be fetched using the same operation that is used to fetch records in the relations; rather, an additional program module had to be provided for this purpose.

My operator means further provides for the interactive definition of a result relation, membership in which is defined characteristically in terms of a record occurrence attribute explicitly defined and present in the database; such interactive definition is thereby made much simpler than has been possible using prior art means.

A particular embodiment of the present invention comprises particular data structure definitions and program modules, running on a Wang VS-100 (virtual storage) computer. Source code for the particular data structure declarations and program modules is provided in the accompanying microfiche appendix.

What is claimed is:

1. In a relational database system, having stored therein relations, each of said relations conforming with constraints sufficient to permit operations on said relations to be modeled and analyzed by relational analysis, apparatus for specifying a result relation comprising target specifying means for specifying a target relation in the relational database system, said target specifying means being responsive to input of target specifying signals, display means for displaying rows of the specified target relation, said display means being responsive to an output from said target specifying means, selecting means for enumeratively selecting certain ones of the rows of the specified target relation, said selecting means being responsive to input of enumerating commands by a user during displaying of said rows of said specified target relation, said enumerating commands having no reference to values in any field of the rows, and result specifying means for specifying a result relation derived from said selected certain ones of rows, said result specifying means being responsive to an output from said selecting means, said result relation conforming with said sufficient constraints.

* * * * *